(12) United States Patent
Uchida

(10) Patent No.: US 8,626,915 B2
(45) Date of Patent: Jan. 7, 2014

(54) ROUTING METHOD

(75) Inventor: Yoshiaki Uchida, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/766,017

(22) Filed: Apr. 23, 2010

(65) Prior Publication Data
US 2010/0205300 A1    Aug. 12, 2010

Related U.S. Application Data

(63) Continuation of application No. PCT/JP2007/070796, filed on Oct. 25, 2007.

(51) Int. Cl.
*G06F 15/173* (2006.01)

(52) U.S. Cl.
USPC .......................... 709/225; 709/224

(58) Field of Classification Search
USPC .............. 709/216, 224, 225, 229; 370/389; 707/100; 710/15
See application file for complete search history.

(56) References Cited

U.S. PATENT DOCUMENTS

| | | | | |
|---|---|---|---|---|
| 6,535,227 B1* | 3/2003 | Fox et al. | | 709/224 |
| 6,742,040 B1* | 5/2004 | Toga | | 709/229 |
| 7,143,096 B2* | 11/2006 | Gemba et al. | | 709/216 |
| 8,010,627 B1* | 8/2011 | Schneebeli et al. | | 709/229 |
| 2002/0107961 A1* | 8/2002 | Kinoshita | | 709/225 |
| 2004/0022242 A1* | 2/2004 | Bhogal et al. | | 370/389 |
| 2004/0111603 A1 | 6/2004 | Iwamura | | |
| 2005/0108257 A1* | 5/2005 | Ishii et al. | | 707/100 |
| 2005/0229245 A1 | 10/2005 | Nakano et al. | | |
| 2006/0059279 A1* | 3/2006 | Kakizaki | | 710/33 |
| 2007/0162749 A1 | 7/2007 | Lim | | |
| 2007/0174501 A1* | 7/2007 | Lin et al. | | 710/15 |

FOREIGN PATENT DOCUMENTS

| | | |
|---|---|---|
| CN | 1698320 A | 11/2005 |
| EP | 1724701 A2 | 11/2006 |
| JP | 2002-312316 | 10/2002 |
| JP | 2003-122615 | 4/2003 |
| JP | 2004-185312 | 7/2004 |
| JP | 2005-130214 | 5/2005 |
| JP | 2006-085401 | 3/2006 |
| JP | 3994126 | 10/2007 |
| WO | 99/46882 | 9/1999 |
| WO | 00/22796 | 4/2000 |
| WO | 2004/100456 A1 | 11/2004 |

OTHER PUBLICATIONS

International Search Report for PCT/JP2007/070796, mailed on Mar. 18, 2008.
Chinese Office Action issued Aug. 24, 2012 in corresponding Chinese Patent Application No. 200780101273.3.
Chinese Office Action mailed Mar. 7, 2013 for corresponding Chinese Application No. 200780101273.3.
Extended European Search Report dated Feb. 17, 2012 issued in corresponding European Patent Application No. 07830530.7.
Chinese Office Action issued May 15, 2012 issued in corresponding Chinese Patent Application No. 200780101273.3.

* cited by examiner

*Primary Examiner* — Quang N Nguyen
(74) *Attorney, Agent, or Firm* — Staas & Halsey LLP

(57) ABSTRACT

A method executed by a router that establishes a connection between a network and an another network that includes an information processing device and an information storage device, the method includes: detecting an access status of the information processing device to the information storage device; and prohibiting transfer of the information from the information processing device to the another network depending on the access status managed in the detecting.

7 Claims, 15 Drawing Sheets

FIG. 3

| IP ADDRESS | MAC ADDRESS | in_use | BTL | protect | OCN |
|---|---|---|---|---|---|
| 192.168.3.32 | 10:20:30:40:50:01 | 0 | 0 | false | 0 |
| 192.168.3.33 | 10:20:30:40:50:02 | 2 | 32 | true | 0 |
| 192.168.3.34 | 10:20:30:40:50:03 | 0 | 0 | false | 15 |

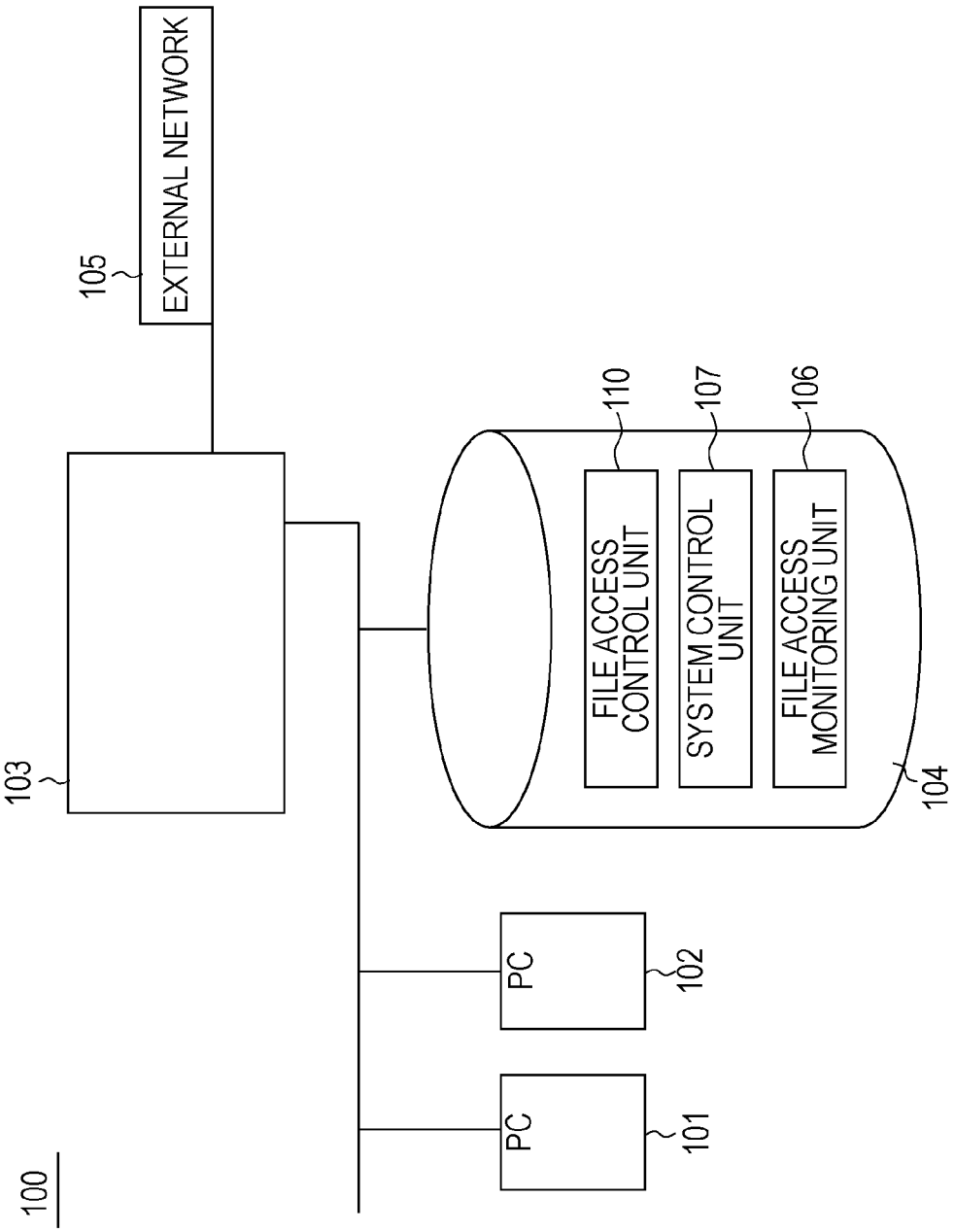

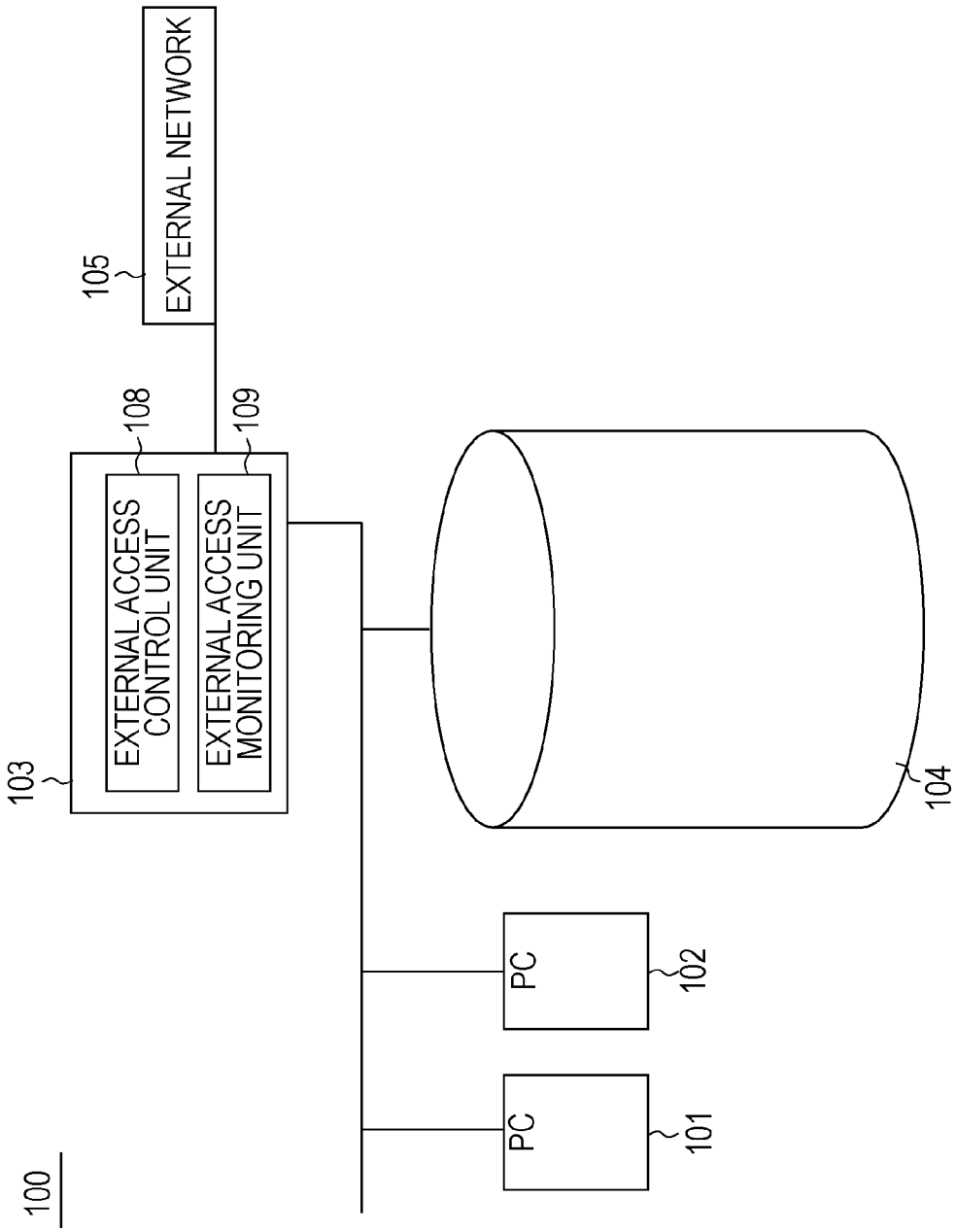

ROUTING METHOD

CROSS-REFERENCE TO RELATED APPLICATION

This is a continuation of Application PCT/JP2007/070796, filed on Oct. 25, 2007, the entire contents of which are incorporated herein by reference.

FIELD

A certain aspect of the embodiments discussed herein relates to technique of a network storage, such as an NAS (network attached storage).

BACKGROUND

A network storage, such as an NAS, has been increasingly used. Constant connection to the Internet in a computer has become common. Therefore, even when users access files in an NAS in a situation that most computers are placed in a closed area, such as a LAN, the computers are connected to the Internet.

This causes a problem that malicious software (hereinafter, referred to as malware) opens data, stored in the NAS, to the public on the Internet in a form that is not intended by a user.

In addition, there may also be a problem due to a careless, inappropriate operation, such as a case where a user misidentifies an actually public area on the Internet as a private work area and then places important private data therein or a case where a user establishes connection to a network while a folder that originally should not be open to the public remains open to the public.

There is a simple solution for the above problems, that is, to "directly unplug a LAN cable"; however, this requires unplugging a LAN cable of a router, or the like, so it is burdensome.

There is the following Patent Document related to a technique for preventing information leakage in a computer.

[Patent Document 1] Japanese Laid-open Patent Publication No. 2003-122615

SUMMARY

According to an aspect of an embodiment, a method executed by a router that establishes a connection between a network and an another network that includes an information processing device and an information storage device, the method includes: detecting an access status of the information processing device to the information storage device; and prohibiting transfer of the information from the information processing device to the another network depending on the access status managed in the detecting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a Bad PC List 203 according to the embodiment.

FIG. 14 is a configuration diagram of the network storage system 100 according to the embodiment.

FIG. 15 is a configuration diagram of the network storage system 100 according to the embodiment.

DESCRIPTION OF EMBODIMENTS

Figure 1:
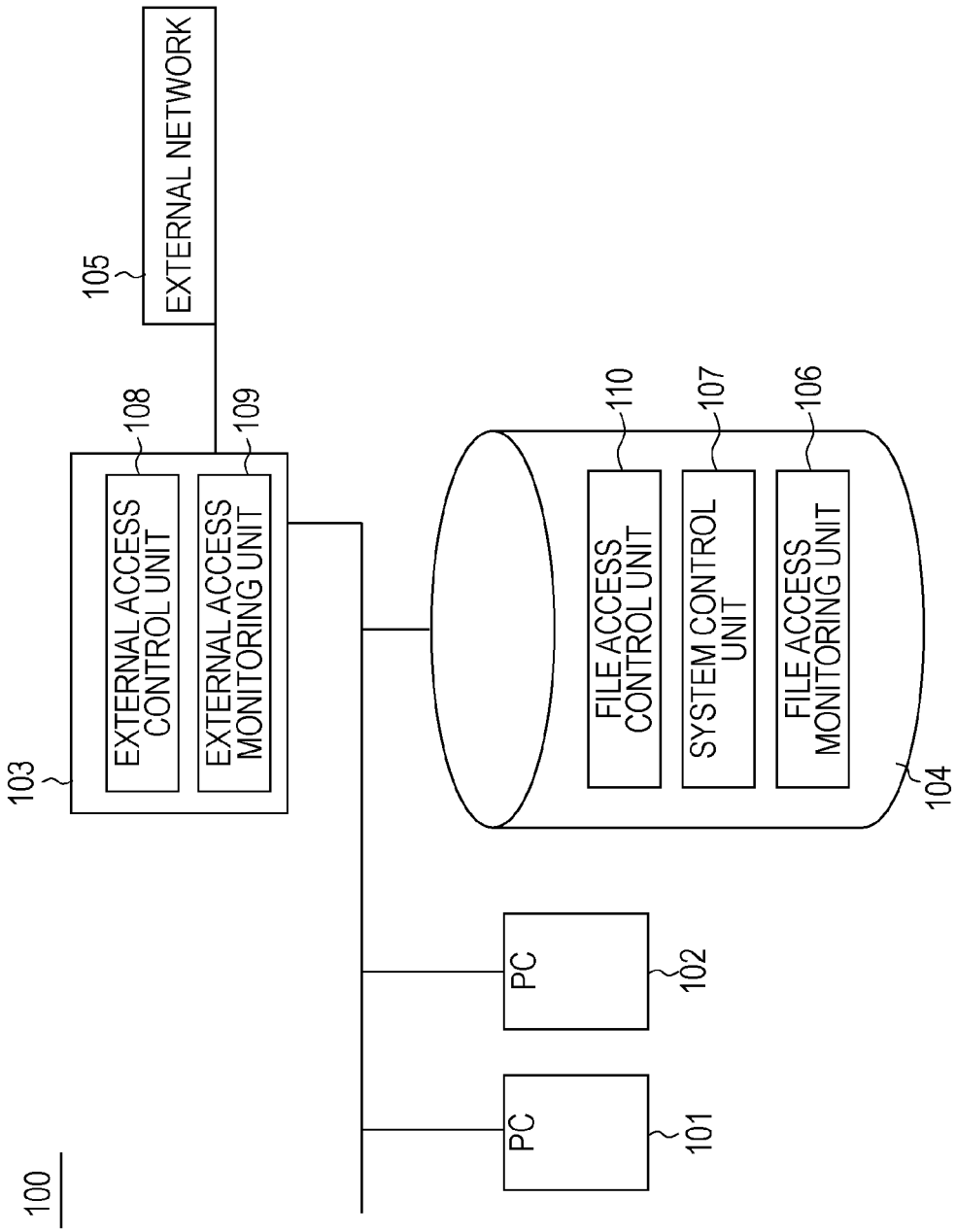
FIG. 1 is a configuration diagram of a network storage system 100 according to the embodiment.

A network storage system according to an embodiment is a system in which a plurality of personal computers and an NAS are connected by a LAN (Local Area Network) and then a network outside the LAN and the personal computers are connected via a router. Then, the personal computers access files via the LAN or access the Internet via the router. The NAS according to the present embodiment executes control so that data stored in the NAS do not leak onto the Internet against user's intention.

A particularly problematic case where data stored in the NAS leak onto the Internet is caused by malware.

A route through which data on the Internet leak owing to malware against user's intention is conceivably the following cases. —Malware sets a secret folder to a public folder of a file sharing folder. —Malware copies a secret file into a public folder. —Malware transfers a secret file by mail at user's unintended timing.

Existing measures for these problems are as follows. —A personal computer detects "malware" by antivirus software. —A personal computer shuts off an external network connection to the personal computer by a software firewall. —A personal computer monitors leakage of important data by a physical firewall.

However, according to the measures of the above described 1, an action against a new type of virus delays. The above measures are ineffective for a personal computer that is initially or early infected with "malicious software".

According to the measures of the above described 2, it is difficult to detect a case where "malicious software" that once starts to run accesses the outside from the inside.

The measures of the above described 3 include a technique that is used to take measures for a SPAM mail or to monitor an Web access conducted by an employee. This technique is such that, for example, when data coming from an external network or exchanged with an external network include a word or an expression that is unlikely to be related to a job or when a source or a relay point is considered to be a suspicious individual, the coming or exchanged data are regarded as unauthorized data. It is presumably possible to use the above technique when important data that should be prevented from leakage are fixed and have a specific pattern. That is, according to the above technique, if a word or an expression that is considered to be important on a job can be selected as a fixed pattern, transmission of data, including the fixed pattern, is prohibited when the data are about to be transferred to the outside.

However, as it is difficult for a firewall to mechanically distinguish abnormal data from normal data throughout only by a word or an expression that is unlikely to be related to a job, it is also difficult to detect data transmission using a word or an expression that is a key to prohibit the data transmission. Therefore, the user just needs to take measures at a later date using the log data of the firewall.

The NAS according to the present embodiment is connected to a personal computer via a network. The NAS is formed of a file access detecting unit and a system control unit. The file access detecting unit detects a file access from the personal computer to the network storage. The system control unit controls interruption of a connection between the personal computer and an external network on the basis of the detected file access. By so doing, while an information processing device is accessing to the NAS, a connection between the information processing device and an external network is interrupted to thereby make it possible to prevent leakage of data, stored in the NAS, to the external network.

[Network Storage System 100]

Hereinafter, a network storage system 100 according to the present embodiment will be described with reference to FIG. 1. FIG. 1 is a configuration diagram of the network storage system 100 according to the present embodiment.

The network storage system 100 is formed of personal computers 101 and 102, a router 103 and a network storage (hereinafter, referred to as NAS) 104. The network storage system 100 is connected to an external network 105 via the router 103. In addition, the NAS 104 is formed of a file access monitoring unit 106, a system control unit 107 and a file access control unit 110. The file access monitoring unit 106, system control unit 107 and file access control unit 110 that are implemented in the NAS 104 are new functions and are characteristics of the NAS 104 according to the present embodiment. In addition, the router 103 has an external access control unit 108 and an external access monitoring unit 109. The external access control unit 108 and the external access monitoring unit 109 function in cooperation with the file access monitoring unit 106, the system control unit 107 and the file access control unit 110, and are characteristics of the router 103 according to the present embodiment. Note that the file access monitoring unit 106, the system control unit 107 and the file access control unit 110 may be provided outside the NAS 104.

Then, in the present embodiment, the personal computer 101 accesses a file in the NAS 104. When malware opens data (file, folder, or the like) in the NAS 104 to the public on the Internet, the malware leaks the data to the external network 105 via the personal computer 101 that accesses a file in the NAS 104.

When there is a file access to a specified folder, the NAS 104 controls the external access control unit 108 of the router 103. The specified folder is a folder that the user specifies as a secret folder. Folders stored in the NAS 104 each have a flag that indicates whether the folder is a secret target.

In the network storage system 100 according to the present embodiment, while the personal computer 101 is editing a secret file, the NAS 104 prohibits the personal computer 101 from accessing the external network 105. By so doing, the network storage system 100 is able to prevent leakage of a secret file stored in the NAS 104 due to malware.

Note that the other personal computer 102 is allowed to refer to the Internet, and data may be referred to within the LAN between the personal computer 101 and the personal computer 102. Note that control for a connection between the external network 105 and the personal computer 101 or 102 is not limited to control implemented by the router 103.

[NAS 104]

The NAS 104 according to the present embodiment not only has a file server function but also has a function of controlling the router 103. Then, the router 103 uses the external access control unit 108 to control communication from the personal computer 101 to the external network 105.

The NAS 104 has folders and files. The files may be contained in the folders or may be placed in the same hierarchy as those of the folders. The file access monitoring unit 106 detects a file access of each of the personal computers 101 and 102. In the present embodiment, the file access monitoring unit 106 detects an api (Application Program Interface) related to the file access of the personal computer 101 or 102 to thereby detect the file access of the personal computer 101 or 102. The api is a set of protocols that define the procedure of software for programming.

When the file access monitoring unit 106 detects an access from the personal computer 101 or 102 to a file, the file access monitoring unit 106 notifies the system control unit 107 of the MAC address or IP address of the access request source (personal computer 101 or 102).

The system control unit 107 controls the external access control unit 108 of the router 103 on the basis of information (MAC address, IP address) received from the file access monitoring unit 106.

The external access control unit 108 interrupts an access of the personal computer 101 or 102 to the external network 105 on the basis of an instruction from the system control unit 107. In addition, the external access control unit 108 may be configured to delay an access of the personal computer 101 or 102 to the external network 105.

For example, it is assumed that malware tries to transmit a secret file (file for which a secret flag is on) that should be originally kept secret to the external network 105 by mail protocol, or the like. At the time when malware reads a secret file, the NAS 104 according to the present embodiment prohibits an access between the external network 105 and the personal computer (personal computer in which malware is present) that has read the secret file. By so doing, data transmission of a secret file by the personal computer ends in failure, and it is possible to prevent information leakage.

In addition, the access control unit 105 prohibits the personal computer from accessing the external network 105. Thus, the access control unit 105 also uniformly prohibits communication with the external network 105, which is a normal job executed by the personal computer. A user of the personal computer identifies that the operation of the system is unstable and then carries out investigation. This gives an opportunity that the user recognizes the presence of malware. With the network storage system 100 according to the present embodiment, the user is able to early find inclusion of malware, so it is possible to prevent secondary damage and expansion of damage.

Therefore, the personal computer is controlled so that a file access to the external network is interrupted while the personal computer is accessing the network storage. By so doing, it is possible to prevent information leakage due to malware.

[Cooperation Function between Router 103 and NAS 104]

Figure 2:
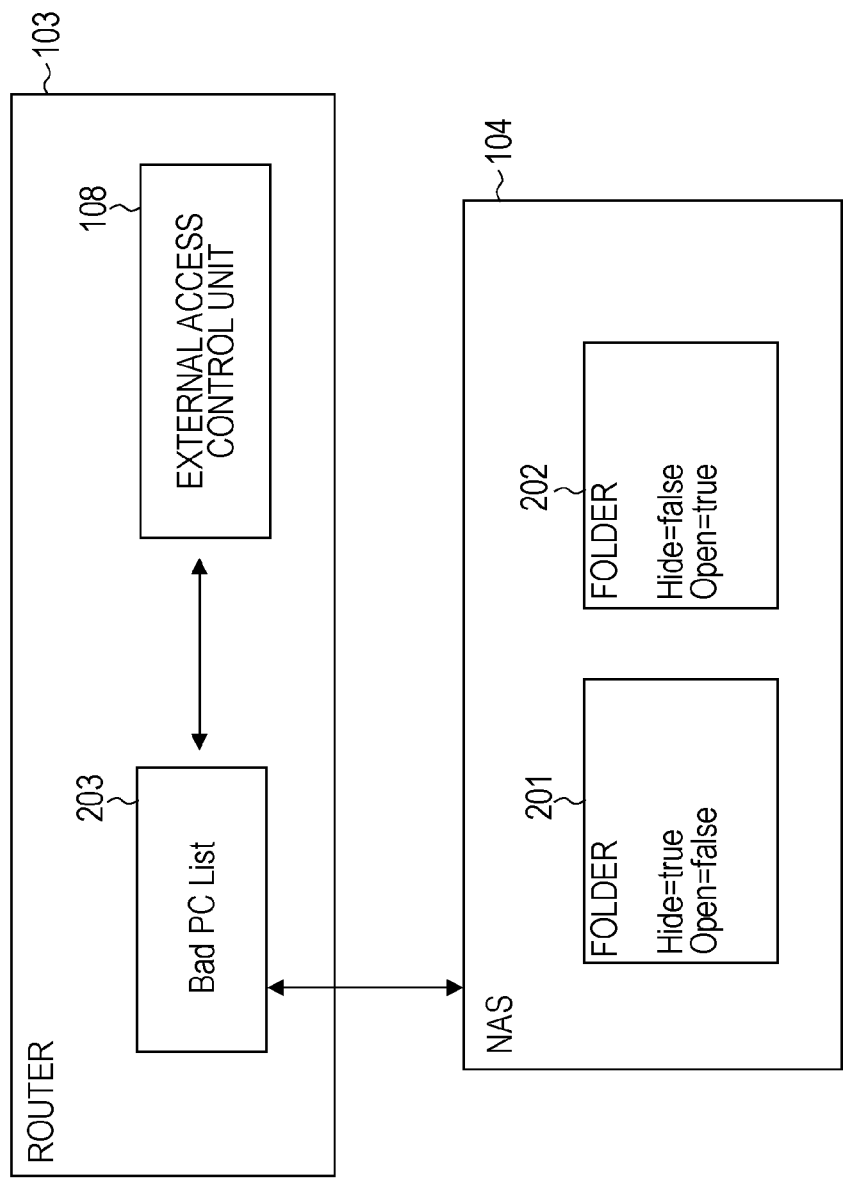
FIG. 2 is a schematic view of a router 103 and NAS 104 according to the embodiment.

FIG. 2 is a schematic view of the router 103 and NAS 104 according to the present embodiment.

Cooperation between the router 103 and the NAS 104 according to the present embodiment will be described in detail. FIG. 2 illustrates the router 103 and the NAS 104 that are equivalent to those shown in FIG. 1. Note that the file access control unit 106 and the system control unit 107 that are implemented in the NAS 104 are not shown in FIG. 2; however, the NAS 104 shown in FIG. 2 also has those functions.

The router 103 has a Bad PC List 203 in addition to the external access control unit 108. FIG. 3 is a specific example of the Bad PC List 203.

The router 103 implements the following functions by software. One of the functions of the router 103 is a function of managing the Bad PC List 203 and then determining whether the respective personal computers 101 and 102 are allowed or rejected to communicate with the external network 105. In addition, one of the functions of the router 103 is a function of updating the Bad PC List 203. Furthermore, one of the functions of the router 103 is a control logic function of discarding an IP packet when the source IP address or MAC address of the IP packet is present in the Bad PC List 203, it is determined to reject communication of the source (personal computer) of the IP packet with the external network 105 and it is determined that the destination of the IP packet is that of the external network 105. Note that the router 103 has a function of determining whether the source and destination of a packet are present in the internal LAN or the external network 105 on the basis of the IP address or MAC address of the packet.

[Bad PC List 203]

FIG. 3 is the Bad PC List 203 according to the present embodiment.

The Bad PC List 203 is formed of an IP address 301, MAC address 302, in_use 303, BTL 304, protect flag 305 and OCN 306 of each of the personal computers 101 and 102 present in the LAN.

The in_use 303 is a counter that indicates the number of factors by which an access is rejected.

The BTL 304 is a down counter that indicates a period of time that elapses until the personal computer 101 or 102 become allowed to access the external network 105.

The protect flag 305 holds an access rejection status to the external net in correspondence with each of the personal computers 101 and 102 that require connection to the external network 105.

The OCN 306 is a down counter that indicates a period of time that elapses until the personal computer 101 or 102 become allowed to access the NAS 104. The OCN 306 is a counter that sets a predetermined value (for example, 20) each time communication between the personal computer 101 or 102 and the external network 105 occurs.

The router 103 counts up the in_use 303 when a factor for rejecting the personal computer 101 or 102 from accessing the external network 105 occurs. Specifically, the factor for rejecting the personal computer 101 or 102 from accessing the external network 105 is that the personal computer 101 or 102 has accessed a specified folder in the NAS 104.

When the router 103 determines that the factor for rejecting the personal computer 101 or 102 from accessing the external network 105 is eliminated, the router 103 counts down the in_use 303. Note that the initial value of the in_use 303 is 0. The fact that the value of the in_use 303 is not "0" indicates that there is a factor for rejecting the personal computer 101 or 102 from accessing the external network 105, so the router 103 sets the protect flag 305 to "protect=true". Then, the router 103 sets the value of the BTL 304 to a prescribed value (for example, 32).

When the router 103 sets the in_use 303 at "0" (that is, the factor for rejecting the personal computer 101 or 102 from accessing the external network 105 is eliminated), the router 103 counts down the value of the BTL 304 at a constant time interval (for example, one second). When the router 103 counts down the BTL 304 and then sets the value of the BTL 304 at "0", the router 103 stops counting down the BTL 304, and changes the protect flag 305 from "true" to "false". By so doing, the personal computer corresponding to "protect=false" is allowed to communicate with the external network 105.

In addition, in the present embodiment, the router 103 counts down the OCN 306 at the same time interval (for example, one second) as that of the BTL 304, and then sets the OCN 306 at "0" to stop counting down the OCN 306. Of course, the time interval at which the OCN 306 is counted down is not necessarily the same as the time interval at which the BTL 304 is counted down.

A value at which the router 103 sets the OCN 306 may be configured to be varied in accordance with a communication protocol (port number) between the personal computer 101 or 102 and the external network 105. In this case, the router 103 executes control so that a value smaller than a value held by the OCN 306 is not written into the OCN 306.

In addition, in the present embodiment, the Bad PC List 203 is a table managed by software installed in the router 103; however, the Bad PC List 203 is not limited to this configuration. The router 103 may implement the Bad PC List 203 by hardware, such as a gate array.

Note that, from the above, the Bad PC List 203 indicates the following facts of current status. The personal computer 101 at the IP address of "192.168.3.32" is allowed to access the external net (protect=false) but the personal computer 101 is carrying out communication only within the LAN (OCN=0). On the other hand, the personal computer 102 at "192.168.3.33" is prohibited to communicate with the external network 105 owing to two factors. Furthermore, the Bad PC List 203 indicates, by the OCN value, that the personal computer at "192.168.3.34" communicated with the external network 105 (20-15=) 5 seconds ago.

[Functions of NAS 104]

Next, the functions of the NAS 104 according to the present embodiment will be described in detail.

The NAS 104 has a Hide flag and an Open flag for each folder that is open to the personal computers 101 and 102 in the LAN.

More specifically, the NAS 104 according to the present embodiment has folders 201 and 202. Then, each of the folders 201 and 202 has a Hide flag and an Open flag. The Hide flag of the folder 201 is "true", and the Open flag is "false". The Hide flag of the folder 202 is "false", and the Open flag is "true".

The "true" of the Hide flag indicates that files in the folder 201 are secret to the external network 105. The "false" of the Hide flag indicates that files in the folder 202 may be open to the external network 105. That is, the Hide flag is information that indicates whether files in a folder having the Hide flag are secret files. Then, the NAS 104 refers to the Hide flag of the folder 201 or 202 to determine whether files in the folder 201 or 202 are secret files.

The "true" of the Open flag indicates that any of the files in the folder 202 is being read (read and written). The "false" of the Open flag indicates that none of the files in the folder 201 are being read (read or written). Each of the folders 201 and 202 has the Open flag in correspondence with each access source personal computer (not shown, but only the Open flag corresponding to the personal computer 101 is typically shown).

Flags that are originally held by the file system may be used as the Hide flag and/or the Open flag. For example, there are methods, such as "it is construed as Hide=true when an Other user is not allowed to read" in the case of a Unix-based file system and "it is construed as Hide=true when there is a Hidden attribute" in the case of a FAT file system. In addition, most file systems have a counter that indicates the number of processes that currently open and a flag that indicates that it is mounted, so the Open flag may be managed by access source personal computers by combining this mechanism with the following b2 mechanism.

In addition, the NAS 104 has a function of identifying a personal computer that has accessed the NAS 104 on the basis of the IP address or the MAC address.

As an example of a way of implementing the above, because a request to the NAS 104 comes via a network, the request source IP address or MAC address may be extracted from the request packet. It is only necessary that this is directly added to a request block intended for the file system as additional information. Note that, when the processing result in the file system is transmitted to the request source personal computer, the source IP address/MAC address (IP address/MAC address of the access request source personal computer) may be extracted.

When the NAS 104 detects that the folder of the Open flag has been changed from "false" to "true" in the folder 201 with the Hide flag of "true", the NAS 104 counts up the in_use of the access source personal computer 101, that is, the Bad PC List 203 corresponding to the extracted IP address/MAC address.

The NAS 104 sets the value of the protect flag 305 to "true" and sets the value of the BTL 304 to a prescribed value (for example, 32). When the NAS 104 changes the Open flag from "true" to "false", the NAS 104 counts down the corresponding in_use.

As described above, the router 103 prohibits data communication between the access source personal computer 101 and the external network 105 while the personal computer 101 is accessing a secret folder and for a constant period of time (32 seconds) after the access has been completed.

The access prohibiting period (BTL 304, OCN 306) does not interfere with a user's normal job. For example, during the access prohibiting period, the user can read and write data of the secret folder while reading and writing a mail. In the meantime, a network access of software, such as malware, is prohibited to make it possible to prevent damage of information leakage. Furthermore, a log or an error message that indicates that communication is blocked is an alarm that malware is running. Therefore, the user can early find malware.

Note that the router 103 does not need to have an NAT function or a DHCP function. Therefore, the router 103 may be implemented by detecting and switching IP/MAC addresses of the destination and source of a packet. Thus, the router 103 is almost equivalent to a switching HUB and is easily formed of hardware.

[External Access Monitoring Unit 109]

Next, the external access monitoring unit 109, which is a new function implemented in the router 103, will be described.

The external access monitoring unit 109 is a function of detecting the status of a connection between each of the personal computers 101 and 102 and the external network 105.

When the personal computer 101 or 102 accesses the external network 105, the NAS 104 prohibits a file access of the personal computer 101 or 102 that accesses the external network 105. In other words, when the router 103 accepts a request for an access from the personal computer 101 or 102 in the LAN to the external network 105, the NAS 104 sets the reading of a folder in the NAS 104 by the personal computer 101 or 102 that has issued the request for an access to the external network 105 as an error for a constant period of time thereafter.

By so doing, when the personal computer 101 or 102 tries to establish connection to the external network 105 because of running of malware, the NAS 104 prohibits the personal computer 101 or 102 from accessing a secret file (secret file stored in the NAS 104) to thereby prevent data leakage.

Specifically, when the external access monitoring unit 109 detects that the personal computer 101 or 102 has accessed the external network 105, the external access monitoring unit 109 sets the value of the OCN 306 in the Bad PC List 203.

The external access monitoring unit 109 sets the value of the OCN 306 in consideration of a network protocol, or the like, used in exchanges between the personal computer 101 or 102 and the external network 105. For example, when the personal computer 101 or 102 uses an SMTP (Simple Mail Transfer Protocol) to carry out exchanges with the external network 105, the external access monitoring unit 109 sets the value of the OCN 306 at "30". When the personal computer 101 or 102 uses an HTTP (Hypertext Transfer Protocol) to carry out exchanges with the external network 105, the external access monitoring unit 109 sets the value of the OCN 306 at "10". In addition, the personal computer 101 or 102 uses an FTP (File Transfer Protocol) to carry out exchanges with the external network 105, the external access monitoring unit 109 sets the value of the OCN 306 at "40". That is, when the personal computer 101 or 102 sends a mail or transfers a file, the access prohibiting period to the NAS 104 is elongated as compared with when the personal computer 101 or 102 carries out Web access. This is to prohibit an access to the external network 105, which is highly likely to cause leakage of a secret file due to malware, for the access prohibiting period.

Note that the external access monitoring unit 109 may be implemented by monitoring communication between the personal computer 101 or 102 and the external network 105 in such a manner that the router 103 cooperates with a firewall.

[File Access Control Unit 110]

In addition, the NAS 104 has the file access control unit 110. The file access control unit 110 is a function of prohibiting the personal computer 101 or 102 in the LAN from accessing a folder that may be open to the public or delaying the access for a constant period of time.

The file access control unit 110 operates on the basis of information from the external access monitoring unit 109 of the router 103. More specifically, the system control unit 107 acquires access detection in the external access monitoring unit 109 of the router 103. Then, the system control unit 107 gives an operation instruction to the file access control unit 110 on the basis of access information acquired from the external access monitoring unit 109. The file access control unit 110 controls an access of the personal computer 101 or 102 to the NAS 104 on the basis of the instruction from the system control unit 107.

In addition, as described above, the external access monitoring unit 109 sets the value of the OCN 306. The system control unit 107 gives an operation instruction to the file access control unit 110 in accordance with the value of the OCN 306. The file access control unit 110 allows a personal computer, of which the value of the OCN 306 is "0", to access the NAS 104. In addition, the file access control unit 110 prohibits a personal computer, of which the value of the OCN 306 is not "0", from accessing the NAS 104.

The system control unit 107 discriminates a folder of which the Hide flag is "true". The file access monitoring unit 104 monitors the Open flag. When the file access monitoring unit 104 detects that the Open flag has changed from "false" to "true", the system control unit 107 acquires the OCN 306 of the personal computer corresponding to the changed Open flag. Then, when the system control unit 107 determines that the Hide flag of the acquired OCN 306 is "true", the system control unit 107 notifies the file access control unit 110 of the OCN 306.

When the file access control unit 110 determines that the value of the OCN 306 is not "0", the file access control unit 100 returns an error to a file access request. That is, the file access control unit 110 prohibits a file access of a personal computer of which the value of the OCN 306 is "0".

[Network Storage System 400]

Figure 4:
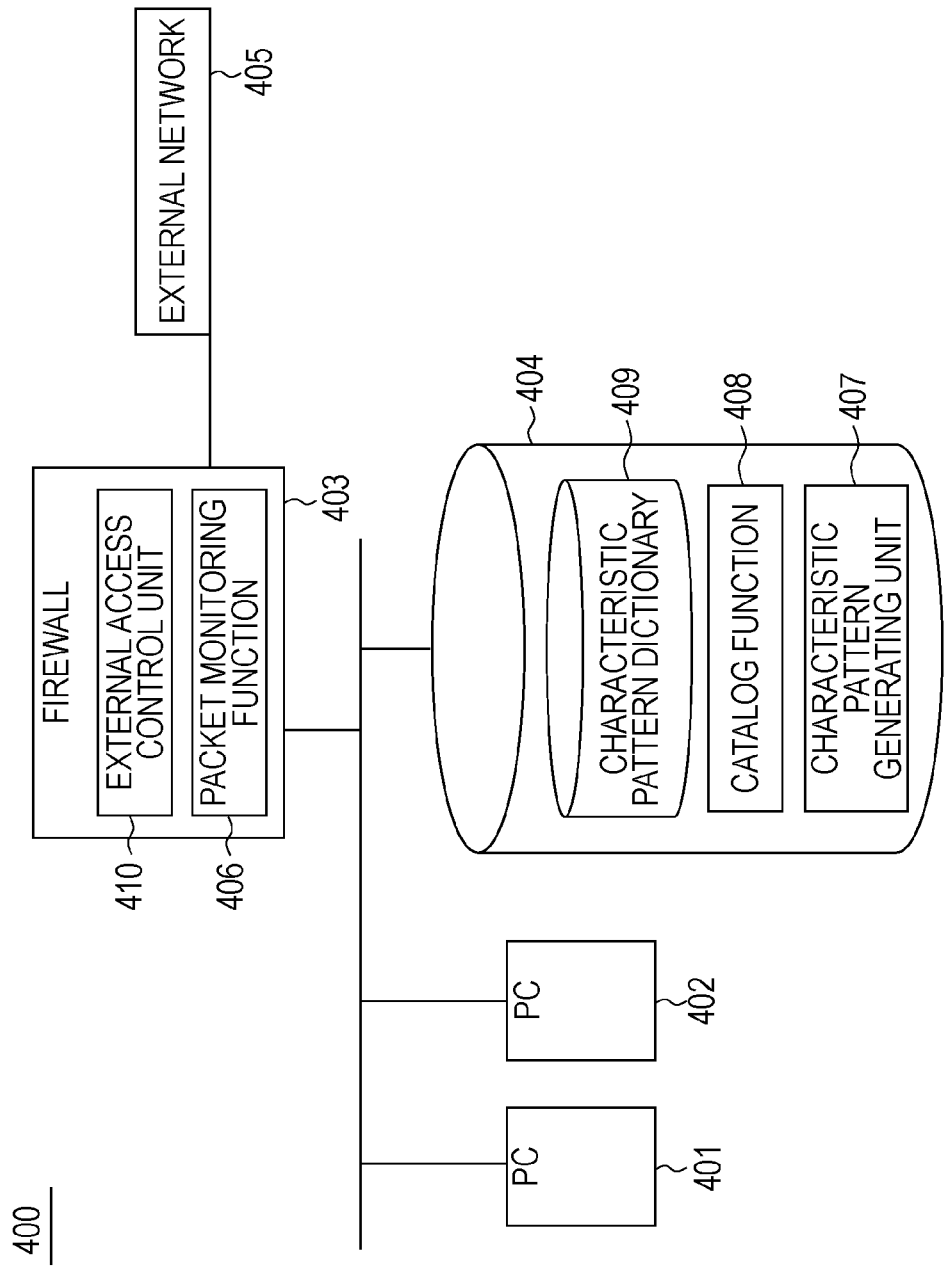
FIG. 4 is a configuration diagram of a network storage system 400 according to the embodiment.

FIG. 4 is a configuration diagram of a network storage system 400 according to the present embodiment.

The network storage system 400 is formed of personal computers 401 and 402, a firewall 403 and an NAS 404. The network storage system 400 is connected to the external network 105 via the firewall 403. The firewall 403 has a packet monitoring unit 406 and a characteristic pattern dictionary 409. In addition, the NAS 404 has a characteristic pattern generating unit 407 and a catalog function 408.

The NAS 404 is able to manage whether it is a secret file file by file. The characteristic pattern generating unit 407 generates a characteristic pattern for each secret file. Then, the catalog function 408 enters the characteristic pattern, generated by the characteristic pattern generating unit 407, into the characteristic pattern dictionary 409. The characteristic pattern indicates whether a file is a secret file. The characteristic pattern generating unit 407, for example, generates a characteristic pattern on the basis of the file name and file content of a secret file.

The packet monitoring unit 406 monitors transfer packets from the personal computers 401 and 402 in the LAN to the external network 405 to determine whether there is a characteristic pattern in the transfer packets. When the firewall 403 has received a transfer packet, the packet monitoring unit 406 refers to the characteristic pattern dictionary 409. When the packet monitoring unit 406 determines that a transfer packet contains a characteristic pattern entered in the characteristic pattern dictionary 409, the external access control unit 410 prohibits transmission of the transfer packet to the external network 105.

By so doing, the network storage system 400 according to the present embodiment uses the characteristic pattern to make it possible to specify a secret file for the firewall 403 and to prevent leakage of a secret file to the external network 405. In addition, the network storage system 400 according to the present embodiment is able to prevent the leakage even when malware has copied a secret file into a public folder.

In addition, a trigger that causes the characteristic pattern generating unit 407 to operate is, for example, any one or combination of the following a, b and c.

a. A user of the NAS 404 issues a start-up instruction to the characteristic pattern generating unit 407.

b. The characteristic pattern generating unit 407 is periodically started up at a prespecified period of time.

c. The pattern generating unit 407 is started up with a trigger of writing to or updating a file.

In addition, the characteristic pattern generating unit 407 calculates a characteristic pattern present in the changed file in the NAS 404. Therefore, the firewall 403 is able to monitor the presence or absence of a characteristic pattern in a transfer packet in real time.

Note that a trigger for starting up the characteristic pattern generating unit 407 may be implemented by using a function of notifying file update and creation of a file system or an operation system implemented in the NAS 404.

In this way, the network storage 400 according to the present embodiment is able to prevent leakage of a file in a specified folder (protect flag is "true") of the NAS 404 and a file altered from the above file or data to the external network 405. The protect flag will be additionally described.

The network storage system 400 according to the present embodiment prohibits transmission of a transfer packet having a characteristic pattern to the external network 105. Therefore, the network storage system 400 according to the present embodiment is able to prevent leakage of a secret file to the external network 405 even when the secret file is present in an unprotected folder.

[Network Storage System 500]

Figure 5:
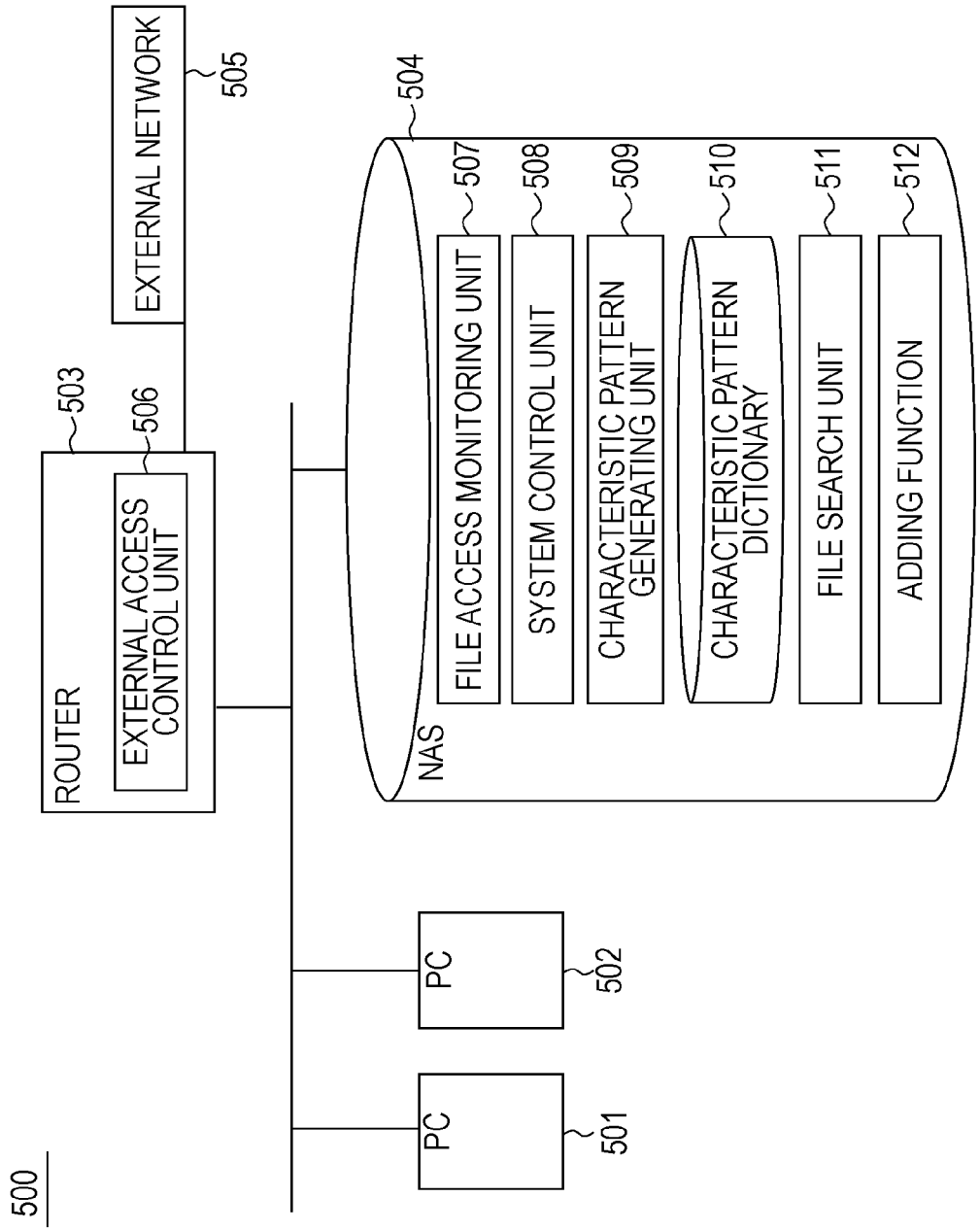
FIG. 5 is a configuration diagram of a network storage system 500 according to the embodiment.

FIG. 5 is a configuration diagram of a network storage system 500 according to the present embodiment.

The network storage system 500 is formed of personal computers 501 and 502, a router 503 and an NAS 504. The network storage system 500 is connected to an external network 505 via the router 503. In addition, the router 503 has an external access control unit 503. The NAS 504 has a file access monitoring unit 507, a system control unit 508, a characteristic pattern generating unit 509, a characteristic pattern dictionary 510 and a file search unit 511.

The network storage system 500 according to the present embodiment is a system that, where necessary, detects a characteristic pattern in a secret file and, where necessary, updates the presence or absence of an access to the secret file. Then, the network storage system 500 according to the present embodiment prohibits a personal computer that has accessed the secret file from accessing the external access network 505. By so doing, the network storage system 500 is also able to prevent leakage of a secret file due to malware.

Hereinafter, the operation of the network storage system 500 will be described.

The personal computer 501 or 502 accesses a file in the NAS 504. When the personal computer 501 or 502 updates a secret file, the characteristic pattern generating unit 509 starts up. The characteristic pattern generating unit 509 generates a characteristic pattern of the updated secret file. The characteristic pattern generating unit 407 generates a characteristic pattern on the basis of the file name and the file content. Then, the characteristic pattern generating unit 509 enters the generated characteristic pattern into the characteristic pattern dictionary 510, and notifies the file search unit 511 of the generated characteristic pattern. The file search unit 511 determines whether the notified characteristic pattern is present in any of the folders in the NAS 504. When the file search unit 511 has detected a folder or a file that contains the generated characteristic pattern, an adding function 512 adds the detected file as a new monitoring target of the file access monitoring unit 507. The file access monitoring unit 507 monitors file accesses from the personal computers 501 and 502 for not only the folder and file that have newly become monitoring targets but also the folder and file that have been already monitoring targets.

The network storage system 500 according to the present embodiment searches a folder other than the specified folder (protect flag is "true") in the NAS 504 or a public folder in the personal computer 501 or 502 or the NAS 504 for the characteristic pattern.

Alternatively, it is also applicable that the NAS 504 has a function of searching all the folders on a personal computer for the characteristic pattern in cooperation with software on the personal computer and the NAS 504 executes any one or both of the following operations a and b.

a. Transmission of a file or a folder, from which the characteristic pattern has been found, to the external network 505 is prohibited.

b. Personal computers are notified of a file or a folder from which a characteristic pattern has been newly detected.

By so doing, the network storage system 500 according to the present embodiment is able to prevent leakage of a secret file to the external network 505 even when the secret file is copied into a folder of which a secret file is not protected.

In addition, the network storage system 500 according to the present embodiment adds a secret file when the secret file is copied into an unprotected folder. Therefore, it is possible to reduce leakage of a secret file to the external network 505 due to user's careless operation.

In addition, in the network storage system 500 according to the present embodiment, when a user specifies a protected folder, a duplication of a file present in that folder may also be set as a protection target. Thus, the network storage system 500 is able to prevent an omission of file protection of the NAS 504 due to user's oversight.

[Network Storage System 600]

Figure 6:
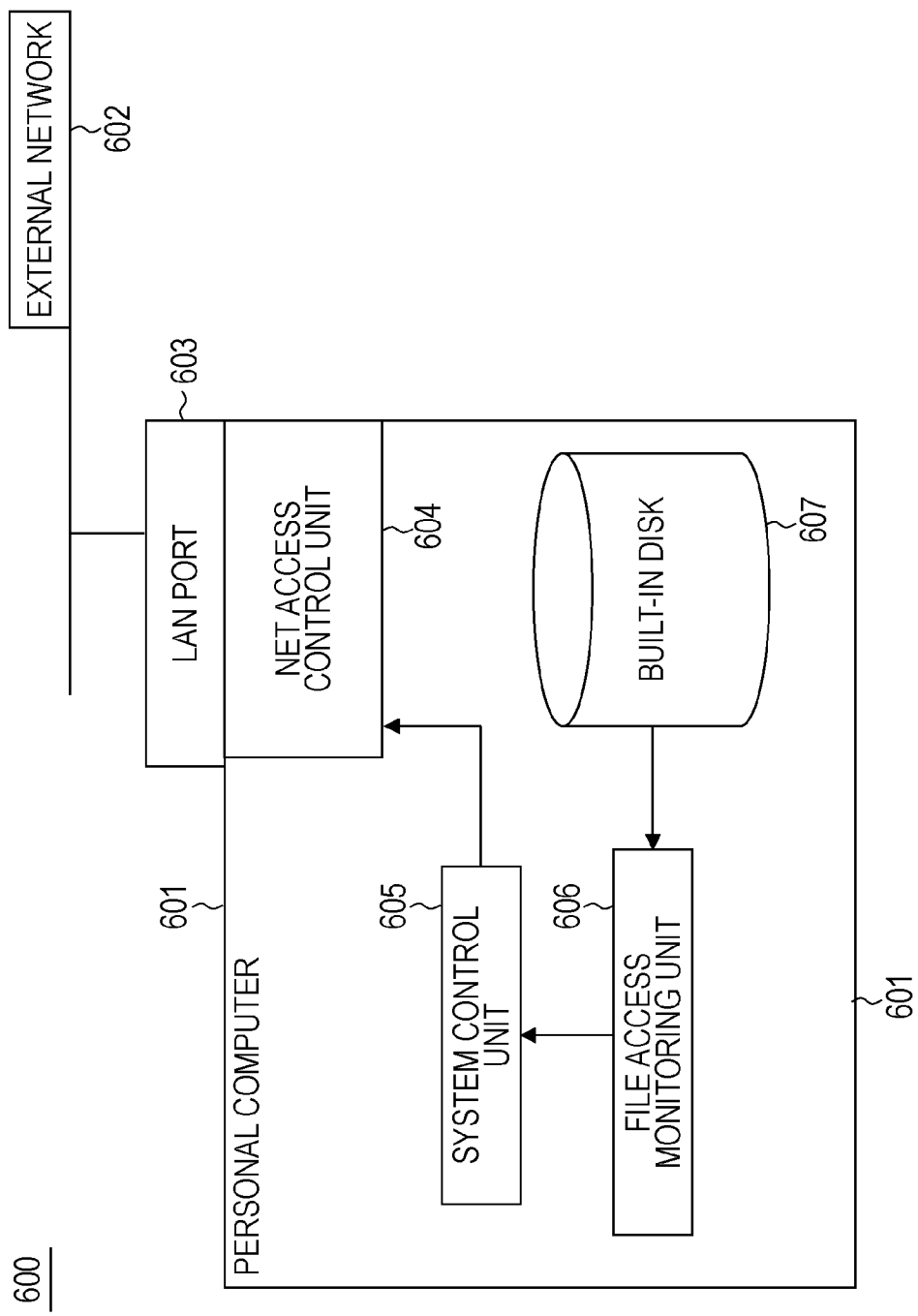
FIG. 6 is a configuration diagram of a network storage system 600 according to the embodiment.

FIG. 6 is a configuration diagram of a network storage system 600 according to the present embodiment.

Next, the network storage system 600 according to the present embodiment will be described.

The network storage system 600 is formed of a personal computer 601 and an external network 602. The personal computer 601 is formed of a LAN port 603, a net access control unit 604, a system control unit 605, a file access monitoring unit 606 and a built-in disk 607. The personal computer 601 has firewall software that runs on the personal computer 601.

The built-in disk 607 stores a secret folder and a secret file. The file access monitoring unit 606 detects a file access to a secret folder or a secret file stored in the built-in disk 607. When the file access monitoring unit 606 has detected a file access to a secret folder or a secret file, the file access monitoring unit 606 notifies the system control unit 605 that the file access has been detected.

When the system control unit 605 receives the notification that the file access has been detected, the system control unit 605 instructs the net access control unit 604 to interrupt connection to the external network 602 on the basis of the notification that the file access has been detected from the file access monitoring unit 606.

The net access control unit 604 interrupts the access of the personal computer 601 to the external network 602 on the basis of the instruction from the system control unit 605.

[Network Storage System 700]

Figure 7:
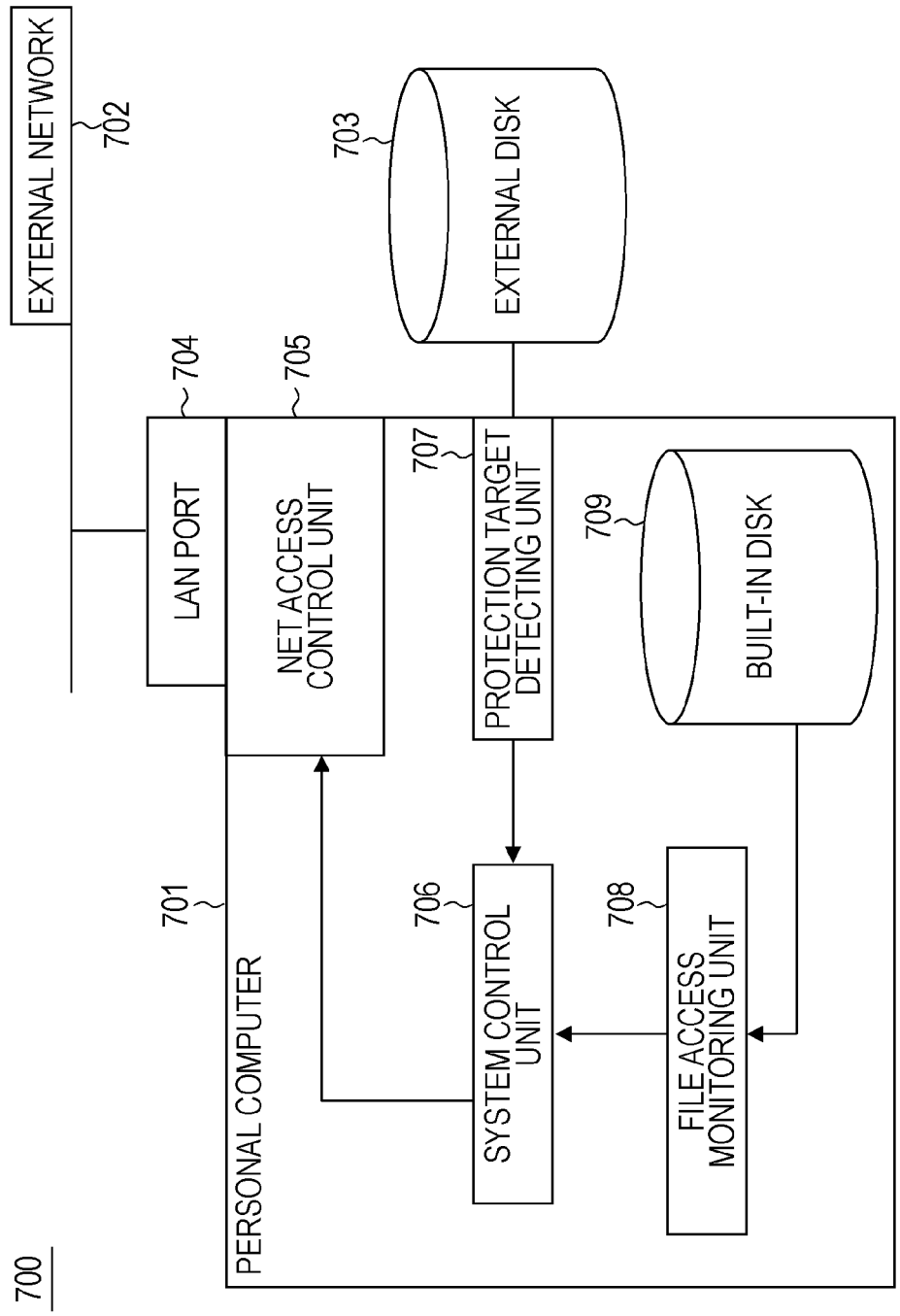
FIG. 7 is a configuration diagram of a network storage system 700 according to the embodiment.

FIG. 7 is a configuration diagram of a network storage system 700 according to the present embodiment.

The network storage system 700 according to the present embodiment will be described.

The network storage system 700 is formed of a personal computer 701, an external network 702 and an external disk 703. Here, the external disk is an MO disk, a USB memory, or the like. The personal computer 701 is connected to the external disk 703 via a USB interface, a SCSI interface, or the like.

The personal computer 701 is formed of a LAN port 704, a net access control unit 705, a system control unit 706, a protection target detecting unit 707, a file access monitoring unit 708 and a built-in disk 709.

When the personal computer 702 accesses a folder or a file stored in the external disk 703, the protection target detecting unit 707 determines that the accessed folder or file is a secret folder or a secret file on the basis of the volume label of the external disk 703, a folder name, or the like. Specifically, a processing logic executed by the protection target detecting unit 707, for example, determines that a folder or a file of which the volume label is "HIDDENxxx" is a protection target. In other words, the protection target detecting unit 707 determines a folder or a file having a predetermined specific volume label as a protection target. Alternatively, the protection target detecting unit 707 determines a folder or a file present in a specific root folder as a protection target.

When the protection target detecting unit 707 determines that a folder or a file stored in the external disk 703 is a protection target, the protection target detecting unit 707 notifies the system control unit 706 that an access between the external network 702 and the personal computer 701 is prohibited.

When the system control unit 706 receives an access prohibiting notification from the protection target detecting unit 707, the system control unit 706 instructs the net access control unit 705 to interrupt connection to the external network 702 on the basis of the notification from the protection target detecting unit 707.

The net access control unit 705 interrupts an access of the personal computer 701 to the external network 702 on the basis of the instruction from the system control unit 706.

In addition, the network storage system 700 uses the file access monitoring unit 708 to detect a file access to a secret folder or a secret file stored in the built-in disk 709. When the file access monitoring unit 708 determines that there is a file access to a secret folder or a secret file stored in the built-in disk 709, the file access monitoring unit 708 notifies the system control unit 706 that the file access has been detected.

When the system control unit 706 receives the file access detection notification from the file access monitoring unit 708, the system control unit 706 instructs the net access control unit 705 to interrupt connection to the external network 702 on the basis of the file access detection notification from the file access monitoring unit 708.

The net access control unit 705 interrupts an access of the personal computer 701 to the external network 702 on the basis of the instruction from the system control unit 706.

The network storage system 700 according to the present embodiment is a system that prohibits an access between the personal computer 701 and the external network 702 when a secret folder or a secret file in the external disk 703 has been accessed.

By so doing, the network storage system 700 according to the present embodiment is able to prevent leakage of secret data, stored in the external disk 703, to the external network 702.

When a secret folder or a secret file stored in the external disk 703 is updated and managed within the external disk 703, the personal computer 701 is able to prevent leakage of the secret folder or the secret file to the external network 702 due to malware.

[Network Storage System 800]

A network storage system 800 according to the present embodiment will be described.

Figure 8:
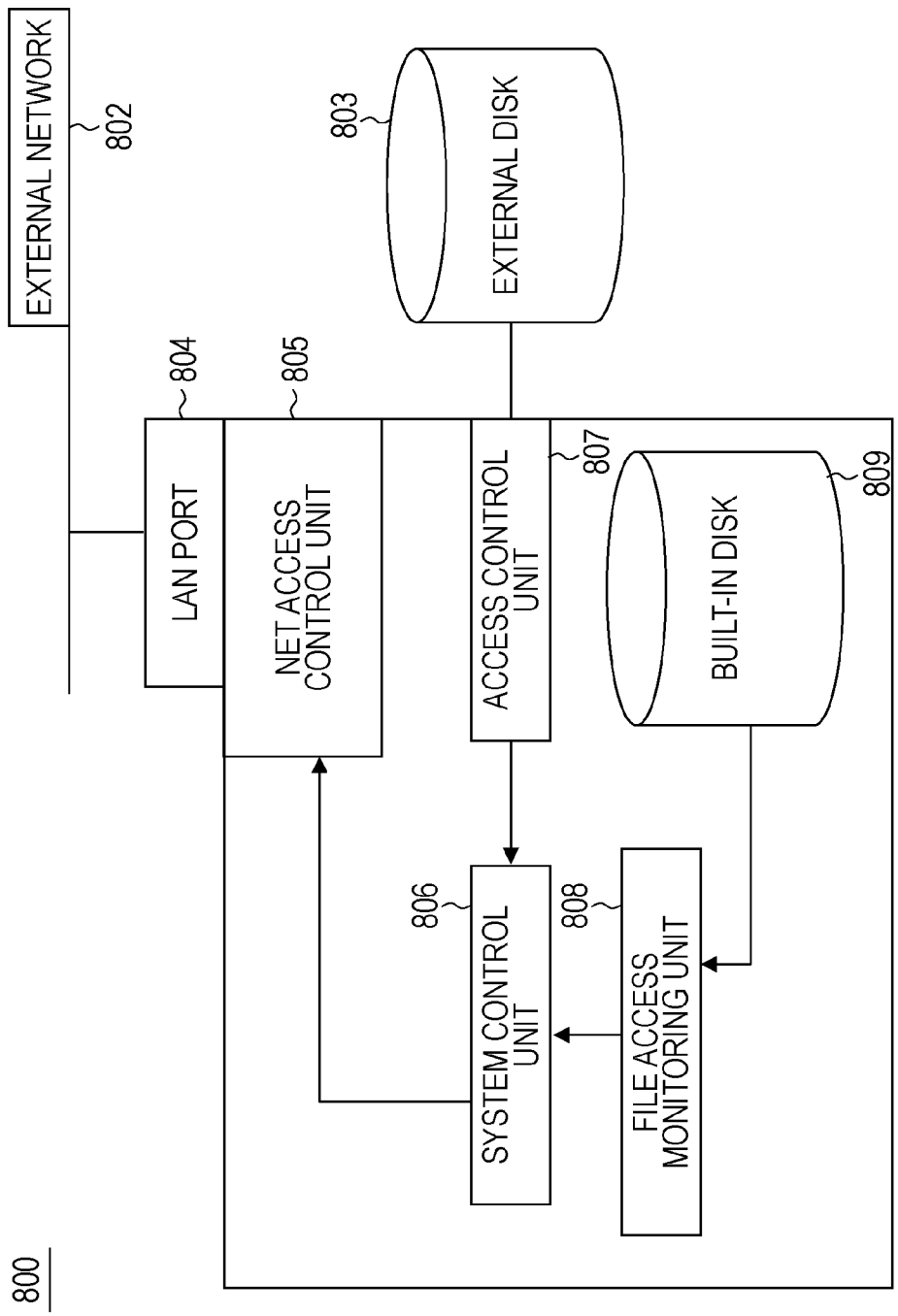
FIG. 8 is a configuration diagram of a network storage system 800 according to the embodiment.

FIG. 8 is a configuration diagram of the network storage system 800 according to the present embodiment.

The network storage system 800 is formed of a personal computer 801, an external network 802 and an external disk 803.

The personal computer 801 is formed of a LAN port 804, a net access control unit 805, a system control unit 806, an access control unit 807, a file access monitoring unit 808 and a built-in disk 809.

In the network storage system 800 as well, the file access monitoring unit 808 detects a file access from the personal computer 801 to a secret folder or a secret file stored in the built-in disk 809.

Then, when the file access monitoring unit 808 determines that there is a file access to a secret folder or a secret file stored in the built-in disk 809, the file access monitoring unit 808 notifies the system control unit 806 that the file access has been detected.

When the system control unit 806 receives the notification that the file access has been detected from the file access monitoring unit 808, the system control unit 806 instructs the net access control unit 805 to interrupt connection to the external network 802 on the basis of the notification that the file access has been detected from the file access monitoring unit 808.

The net access control unit 805 interrupts an access of the personal computer 801 to the external network 802 on the basis of the instruction from the system control unit 806.

Then, data stored in the external disk 803 are encrypted. The external disk 803 is a portable recording medium. By encrypting data in the external disk 803, it is configured to be able to prevent leakage of data even when a user loses the external disk 803 by carelessness.

The personal computer 801 has the access control unit 807. The access control unit 807 decodes encrypted data stored in the external disk 803. Specifically, the access control unit 807 carries out password authentication, fingerprint authentication, or the like. By so doing, the access control unit 807 decodes encrypted data stored in the external disk 803. When the access control unit 807 determines that reading from and writing to the external disk 803 are allowed, the access control unit 807 notifies the system control unit 806 that an access between the external network 802 and the personal computer 801 is prohibited.

When the system control unit 806 receives the notification that the access is prohibited from the access control unit 807, the system control unit 806 instructs the net access control unit 805 to interrupt connection to the external network 802 on the basis of the notification from the access control unit 807.

The net access control unit 805 interrupts an access of the personal computer 801 to the external network 802 on the basis of the instruction from the system control unit 806.

In addition, the net access control unit 805 may be configured to allow network access that is not likely to leak secret data (secret folder, secret file) to the external network 802, such as an NTP (Network Time Protocol) and a ping response.

[Flowchart of Open Operation]

Figure 9:
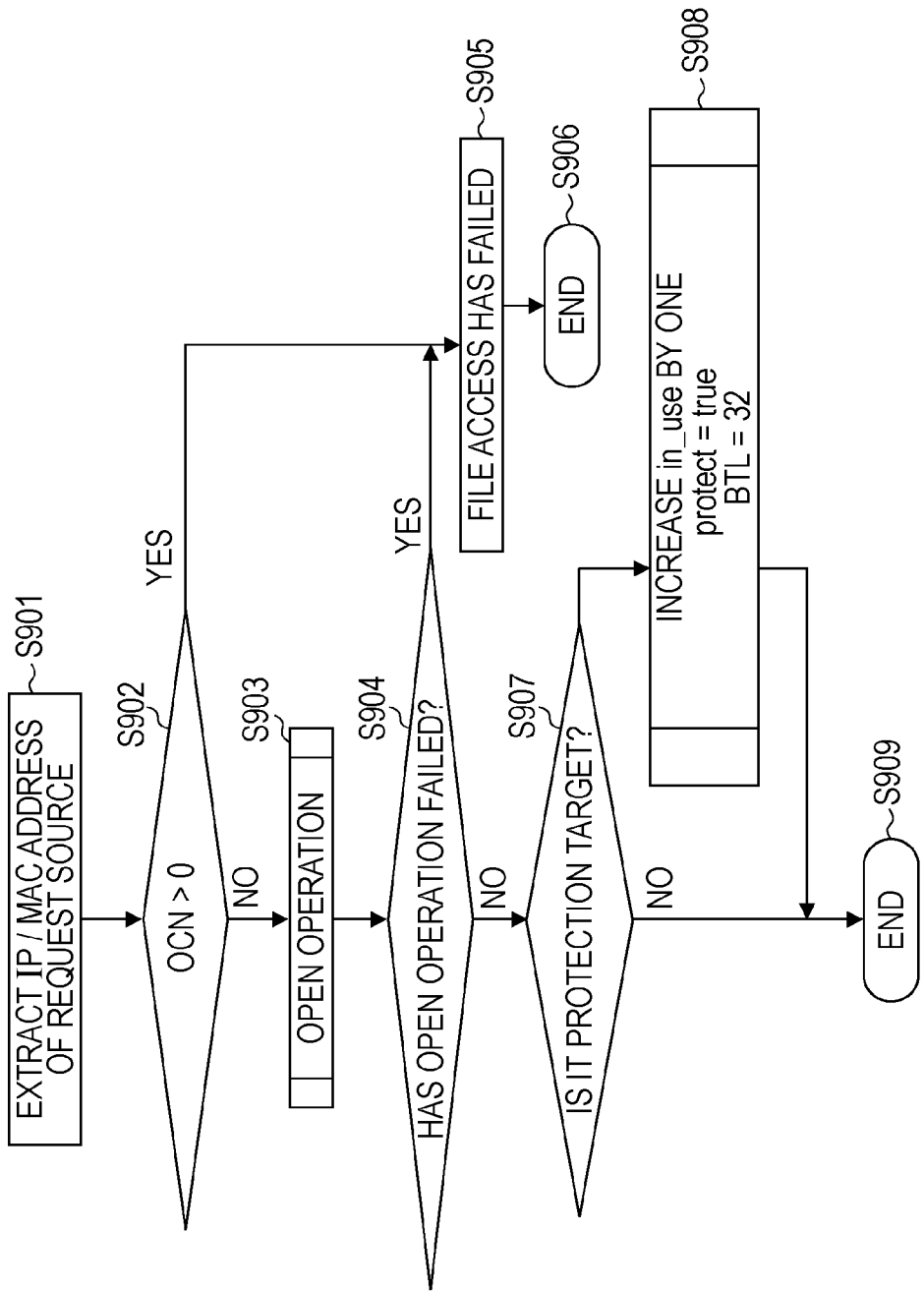
FIG. 9 is a flowchart related to open operation of the NAS according to the embodiment.

FIG. 9 is a flowchart related to operation (open operation) of accessing a file or a folder stored in the NAS 104 according to the present embodiment.

When the personal computer 101 or 102 accesses the NAS 104, the personal computer 101 or 102 transmits a request packet to the NAS 104.

The file access monitoring unit 106 implemented in the NAS 104 extracts the IP address/MAC address of the request source that has accessed a file in the NAS 104 from the request packet (step S901).

The file access monitoring unit 106 refers to the Bad PC List 203 and then determines whether the value of the OCN 306 corresponding to the access request source is larger than 0 (step S902). When the file access monitoring unit 106 determines that the value of the OCN 306 corresponding to the access request source is larger than "0" (YES in step S902), the file access monitoring unit 106 prohibits a file access of the request source (step S905) and then ends the access operation (step S906).

In addition, the file access monitoring unit 106 determines that the value of the OCN 306 corresponding to the access request source is not larger than 0 (specifically, the value of the OCN 306 is 0) (NO in step S902), the system control unit 107 allows the file access to execute open operation (step S903). The open operation is an operation in which the system control unit 107 opens a file for which an access request is issued.

Then, the system control unit 107 determines whether the open operation has failed (step S904). When the system control unit 107 determines that the open operation has failed (YES in step S904), the file access monitoring unit 106 prohibits a file access of the request source (step S905) and then ends the access operation (step S906). When the system control unit 107 determines that the open operation is successful (NO in step S904), the system control unit 107 determines whether a file subjected to open operation is a protection target file (step S907).

When the system control unit 107 determines that the file subjected to open operation is a protection target (YES in step S908), the system control unit 107 counts up the in_use 303 corresponding to the access request source by one, sets the protect flag 305 to "true" and then sets the BTL at "32" (step S908). When the system control unit 107 determines that the file subjected to open operation is a protection target (step S909), the system control unit 107 ends open operation (step S909).

[Flowchart of Close Operation]

Figure 10:
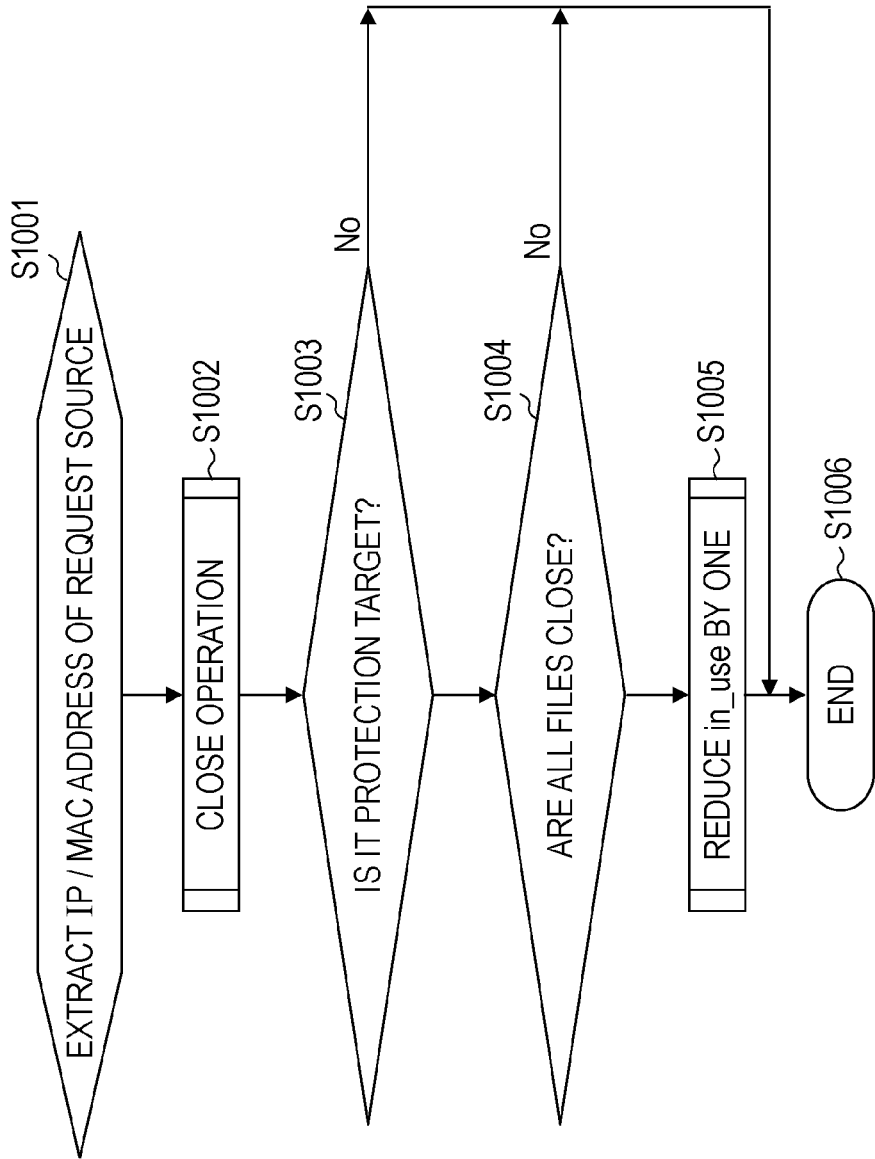
FIG. 10 is a flowchart related to close operation of the NAS 104 according to the embodiment.

FIG. 10 is a flowchart related to operation (close operation) of accessing a file or a folder stored in the NAS 104 according to the present embodiment.

When the personal computer 101 or 102 accesses the NAS 104, the personal computer 101 or 102 transmits a request packet to the NAS 104.

The file access monitoring unit 106 implemented in the NAS 104 extracts the IP address/MAC address of the request source that has accessed a file in the NAS 104 from the request packet (step S1001).

The file access monitoring unit 106 notifies the system control unit 107 of the IP address/MAC address of the request source, and the system control unit 107 executes close operation (step S1002).

Then, the system control unit 107 determines whether a file subjected to close operation is a protection target file (step S1003). When the system control unit 107 determines that the file subjected to close operation is not a protection target (NO in step S1003), the system control unit 107 ends close operation (step S1006). When the system control unit 107 determines that the file subjected to close operation is a protection target (YES in step S1003), the system control unit 107 determines whether all the files in a folder to which the protection target file belongs are close (step S1004).

When the system control unit 107 determines that all the files in the folder are close (YES in step S1004), the system control unit 107 counts down the in_use 303 corresponding to the access request source by one (step S1005) and then ends close operation (step S1006). In addition, when the system control unit 107 determines that not all the files in the folder are close (NO in step S1004), the control unit 07 ends close operation (step S1006).

[Flowchart of Counting Operation]

Figure 11:
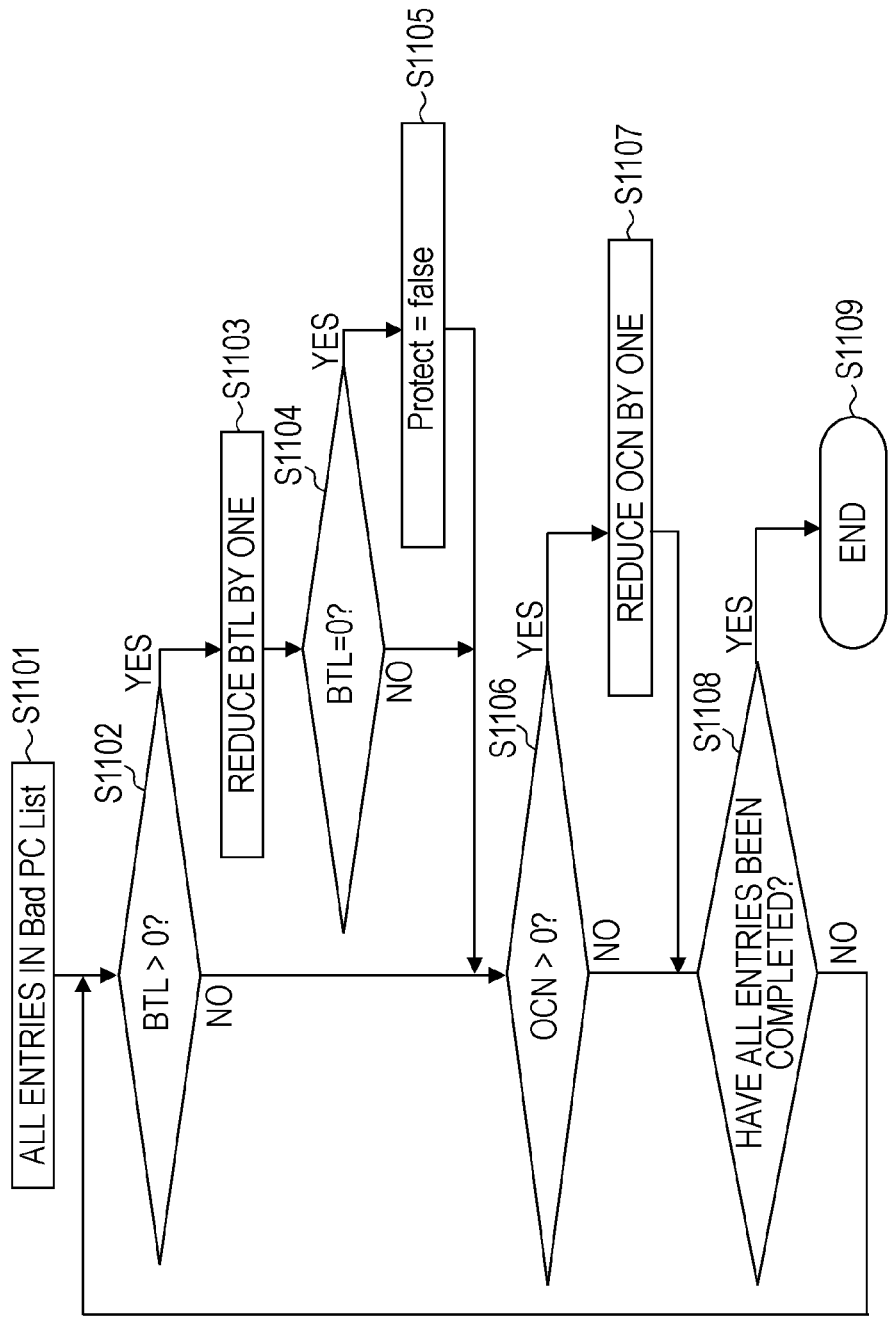
FIG. 11 is a flowchart of counting operation executed by the router 103 according to the embodiment.

FIG. 11 is a flowchart of counting operation executed by the router 103 according to the present embodiment. The function of the router 103 that executes the flowchart shown in FIG. 11 is a function of managing the above described Bad PC List 203 and then determining whether the respective personal computers 101 and 102 are allowed or rejected to communicate with the external network 105. Note that the counting operation is an operation of counting a period of time during which connection between personal computer 101 or 102 and the external network 105 is interrupted.

The router 103 has an internal timer (not shown). The router 103 starts up the monitoring process every one second by the internal timer. The router 103 refers to the Bad PC List 203 (step S1101). The router 103 determines whether the BTLs 304 corresponding to all the personal computers (personal computers 101 and 102) entered in the Bad PC List 203 are larger than "0" (step S1102). When the router 103 determines that the BTL 304 is larger than "0" (YES in step S1103), the router 103 counts down the value of that BTL 304, for which it is determined that the value of the BTL 304 is larger than "0", by one (step S1103).

Then, the router 103 determines whether the BTL 304 has become "0" as a result of counting down by one (step S1104). When the router 103 determines that the BTL 304 has become "0" (YES in step S1104), the router 103 changes the protect flag 305, for which it is determined that the BTL 304 has become "0", from "true" to "false" (step 51105). When the router 103 determines that the BTL 304 is not "0" (NO in step S1104), the router 103 determines whether the OCNs 306 corresponding to all the personal computers (personal computers 101 and 102) are larger than "0" (step S1106). In addition, in step S1102, when it is determined that the BTLs 304 corresponding to all the personal computers (personal computers 101 and 102) entered in the Bad PC List 203 are not larger than "0" (NO in step S1102), the router 103 determines whether the OCNs 306 corresponding to all the personal computers (personal computers 101 and 102) are not larger than "0" (step S1106).

When the router 103 determines that the OCN 306 is larger than "0" (YES in step S1106), the router 103 counts down the value of that OCN 306 by one (step S1107). When the router determines that the OCNs 306 corresponding to all the personal computers (personal computers 101 and 102) are not larger than "0" (NO in step S1106), the router 103 determines whether counting operation has been executed on the BTLs 304 and OCNs 306 of all the entries entered in the Bad PC List 203 (step S1108).

When the router 103 determines that counting operation has been executed on the BTLs 304 and OCNs 306 of all the entries entered in the Bad PC List 203 (YES in step S1108), the router 103 ends the operation (step S1109). In addition, when the router 103 determines that counting operation has not executed on the BTLs 304 and OCNs 306 of all the entries entered in the Bad PC List 203 (NO in step S1108), the router 103 determines whether the values of the BTLs 304 are larger than "0" again (step S1102).

[Flowchart of Packet Transfer Operation]

Figure 12:
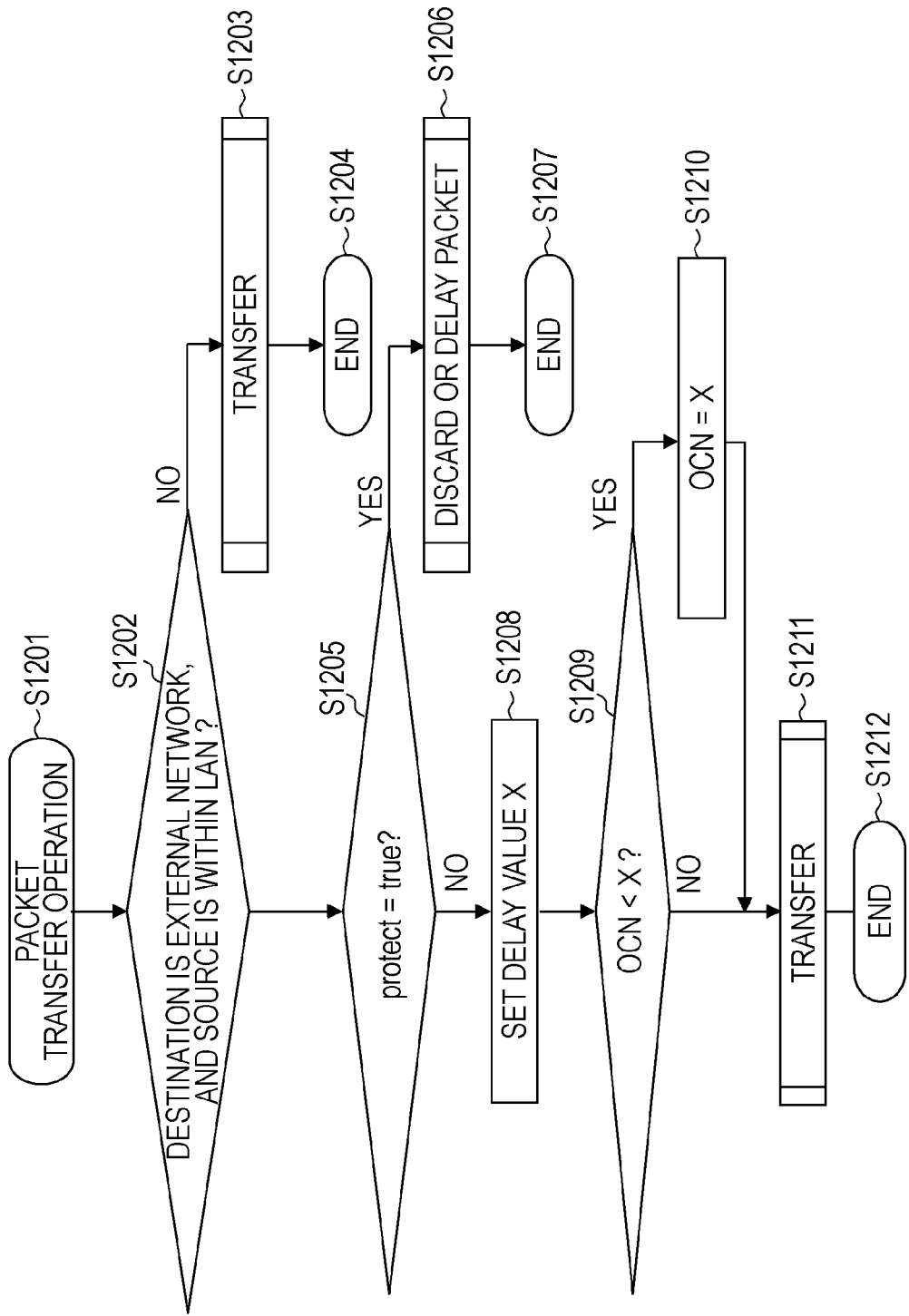
FIG. 12 is a flowchart of packet transfer operation executed by the router 103 according to the embodiment.

FIG. 12 is a flowchart of packet transfer operation executed by the router 103 according to the present embodiment.

When the router 103 receives a packet from the personal computer 101 or 102, the router 103 starts packet transfer operation (step S1201).

The router 103 determines whether the destination of the received packet is the external network 105 and the source of the received packet is the personal computer 101 or 102 within the LAN (step S1202) When the router 103 determines that the destination of the packet is not the external network 105 or the source of the received packet is not the personal computer 101 or 102 in the LAN (in other words, when at least the destination of the packet is not the external network 105 and the source of the packet is not the personal computer 101 or 102) (NO in step S1202), the router 103 transfers the received packet to a predetermined destination (step S1203), and then ends packet transfer operation (step S1204).

When the router 103 determines that the destination of the packet is the external network 105 and the source of the received packet is the personal computer 101 or 102 in the LAN (YES in step S1202), the router 103 determines whether the protect flag 305 corresponding to the personal computer of the packet source is "true" (step S1205).

When the router 103 determines that the protect flag 305 corresponding to the personal computer of the packet source is not "true" (protect flag 305 is "false") (NO in step S1205), the router 103 determines a delay value (X) in accordance with a protocol used for communication (step S1208).

Then, the router 103 determines whether the value of the OCN 306 is smaller than the delay value (X) (step S1209). When the router 103 determines that the value of the OCN 306 is smaller than the delay value (X) (YES in step S1209), the router 103 sets the value of the OCN to the delay value (X) (step S1210).

Then, when the router 103 determines that the value of the OCN 306 is not smaller than the delay value (X) (NO in step S1209), the router 103 executes packet transfer operation (step S1211) and then ends packet transfer operation (step S1212).

Figure 13:
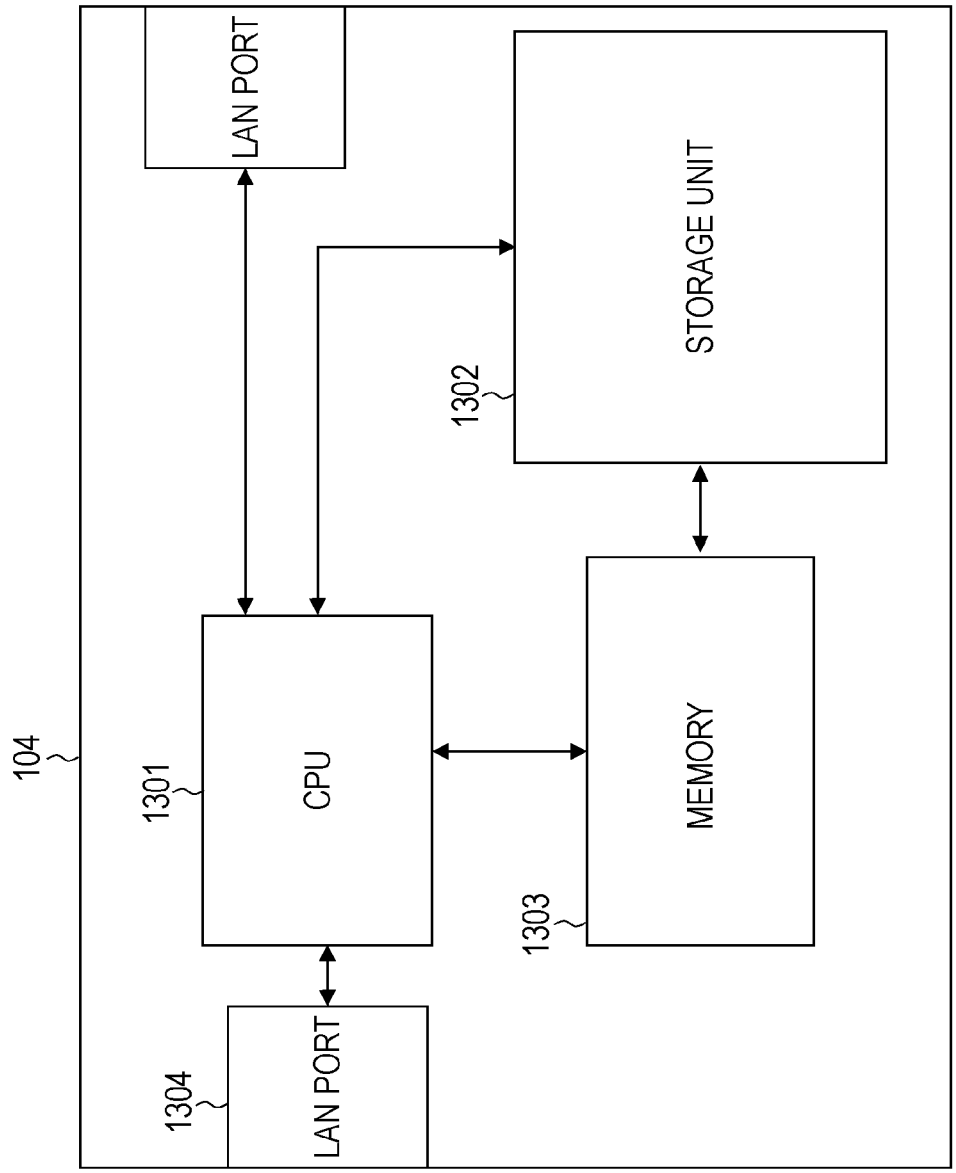
FIG. 13 is a hardware block diagram of the NAS 104 according to the embodiment.

FIG. 13 is a hardware block diagram of the NAS 104 according to the present embodiment.

The hardware configuration of the NAS 104 will be described. The NAS 104 is formed of a CPU (Central Processing Unit) 1301, a storage unit 1302, a memory 1303 and LAN ports 1304 and 1305.

The NAS 104 is connected to the personal computers 101 and 102 via the LAN port 1304. In addition, the NAS 104 is connected to the router 103 via the LAN port 1305.

The file access monitoring unit 106, system control unit 107 and file access control unit 110 of the NAS 104 are functions that are executed by the CPU 1301 as software. Therefore, the file access monitoring unit 106, the system control unit 107 and the file access control unit 110 are stored in the storage unit 1302 as software. Then, when the CPU 1301 executes the file access monitoring unit 106, the system control unit 107 or the file access control unit 110, the CPU 1301 expands the file access monitoring unit 106, the system control unit 107 or the file access control unit 110 in the memory 1303 and then executes it.

In addition, FIG. 14 is a configuration diagram of the network storage system 100, describing the functions of the NAS 104 according to the present embodiment. The NAS 104 has the functions of the file access monitoring unit 106, system control unit 107 and file access control unit 110. The file access monitoring unit 106, the system control unit 107 and the file access control unit 110 are functions that control the network storage system 100. Even when a personal computer infected with malware accesses a file in the NAS 104, the NAS 104 is able to prevent leakage of a file or a folder, stored in the NAS 104, to the external network 105.

In addition, FIG. 15 is a configuration diagram of the network storage system 100, describing the functions of the router 103 according to the present embodiment. The router 103 has the functions of the external access control unit 108 and external access monitoring unit 109. The external access control unit 108 and the external access monitoring unit 109 are functions of controlling the network storage system 100. The external access control unit 108 is a function of controlling whether to transfer a packet, received from the personal computer 101 or 102, to the external network 105. In addition, the external access monitoring unit 109 is a function of monitoring the status of connection between the external network 105 and each of the personal computers 101 and 102. The router 103 executes the external access control unit 108 and the external access monitoring unit 109 for control as software. Thus, the router 103 also has a CPU, a storage unit, a memory or hardware equivalent to these in order to execute the external access control unit 108 and the external access monitoring unit 109. The external access control unit 108 and the external access monitoring unit 109 may be the ones that are physically present in hardware configuration.

Even when a personal computer infected with malware accesses a file in the NAS 104, the external access control unit 108 and the external access monitoring unit 109 are able to prevent leakage of a file or a folder, stored in the NAS 104, to the external network 105.

Industrial Applicability

The network storage system according to the present embodiment relates to data protection in a storage connected via a network.

With the network storage system according to the present embodiment, it is possible to effectively prevent leakage of data to an external network due to malware or a careless, inappropriate net access.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. A method executed by a router that establishes a connection between a first network and a second network different from the first network, the first network including an information processing device and an information storage device, the method comprising:
   detecting an access status of the information processing device to the information storage device; and
   prohibiting transfer of the information from the information processing device to the second network for a period including a first period of time for which the information processing device accesses a specified folder in the information storage device, on a basis of the access status.

2. The method according to claim 1, wherein
the detecting includes acquiring the access status from the information storage device.

3. The method according to claim 2, wherein
the detecting includes managing a period of time during which transfer of the information from the information processing device to the second network is prohibited in the prohibiting.

4. The method according to claim 3, further comprising:
detecting a connection between the information processing device and the second network.

5. The method according to claim 4, wherein
the detecting includes managing a connection status between the information processing device and the second network.

6. The method according to claim 5, wherein
the detecting includes managing a period of time, during which an access from the information processing device to the information storage device is prohibited, depending on a connection status between the information processing device and the second network.

7. The method according to claim 1, wherein
the period includes a second period of time before or after the first period of time.

* * * * *